(No Model.)
M. A. JOUËT-PASTRÉ.
APPARATUS FOR MANUFACTURING HOLLOW ARTICLES.
No. 516,056. Patented Mar. 6, 1894.
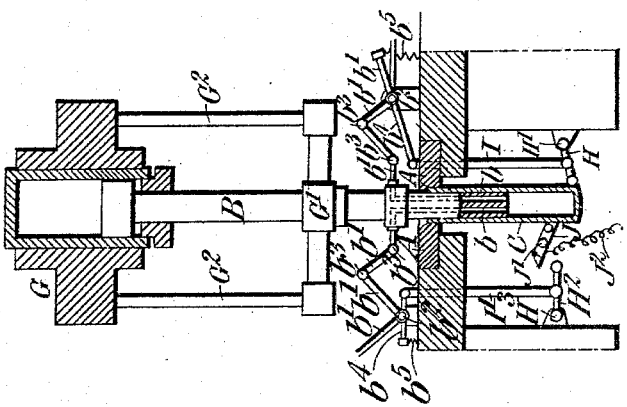
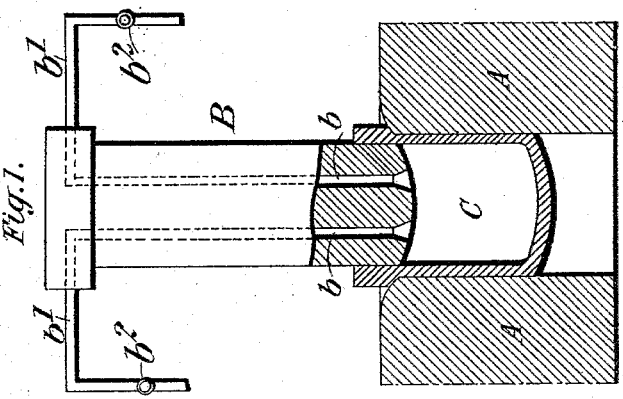
Witnesses
Inventor
Michel Albert Jouët-Pastre

UNITED STATES PATENT OFFICE.

MICHEL ALBERT JOUËT-PASTRÉ, OF PARIS, FRANCE, ASSIGNOR TO THE SOCIÉTÉ POUR LA FABRICATION DES MUNITIONS D'ARTILLERIE, OF SAME PLACE.

APPARATUS FOR MANUFACTURING HOLLOW ARTICLES.

SPECIFICATION forming part of Letters Patent No. 516,056, dated March 6, 1894.

Application filed March 2, 1893. Serial No. 464,418. (No model.)

*To all whom it may concern:*

Be it known that I, MICHEL ALBERT JOUËT-PASTRÉ, president of the Société pour la Fabrication des Munitions d'Artillerie, a citizen of the Republic of France, and a resident of 9 Rue de la Tour des Dames, Paris, France, have invented certain new and useful Improvements in Apparatus for Manufacturing Hollow Articles, of which the following is a specification, reference being had to the accompanying drawings.

This invention has for its object to provide new and improved means for the manufacture of hollow articles, such as copper cartridge cases for quick firing guns, metal tubes, and other articles.

To accomplish this object my invention consists in the method and apparatus hereinafter described and claimed, reference being made to the accompanying drawings, in which—

Figure 1 illustrates my invention as applied to the formation of a cylindrical vessel; the mold, the vessel formed therein, and a portion of the plunger being shown in vertical section, and the rest of the plunger in side elevation. Fig. 2 shows in section the vessel partially formed by any ordinary process such as by means of a solid plunger, prior to being treated according to the present invention. Fig. 3 is a side elevation partly in section, illustrating the application of the invention to the loosening of an article which has been formed by means of a solid plunger.

Like letters denote corresponding parts throughout the drawings.

Referring to Fig. 1, A is the draw-plate mold or die which has the same internal shape as the vessel to be produced therein.

B is the plunger which is adapted merely to fit the mouth of the vessel, and is not intended to shape the plastic material by being pressed thereon as in the ordinary method of forming articles by pressure.

C is the plastic vessel undergoing treatment. The shape of this vessel prior to being inserted in the mold is represented in Fig. 2.

In the plunger B are formed thoroughfares $b\ b$ open at their lower or inner ends for conducting the fluid into the interior of the vessel C for performing the shaping operation. The said thoroughfares $b\ b$ are connected at their upper or outer ends by pipes $b'\ b'$ with a suitable reservoir or pump for supplying compressible or incompressible fluid under pressure.

$b^2, b^2$ are cocks in the pipes $b'\ b'$ for shutting off or controlling the supply of fluid as desired. These cocks may be operated either by hand or automatically by systems of levers and rods hereinafter explained with reference to Fig. 3.

I have shown two sets of thoroughfares and pipes $b, b'$ but I may have only one such set, or I may have more than two.

The operation of drawing the vessel is performed as follows, that is to say, the partially formed article such as illustrated in Fig. 2 is placed in the mold A, and the plunger B is inserted therein and rigidly held in position. Then the cock or cocks $b^2$ is or are opened and the fluid under pressure is conducted into the interior of the hollow article. By reason of its pressure this fluid operates like a punch, and effects the pressing or drawing of the article by forcing it through and against the sides of the mold. When the operation is completed the cock or cocks $b^2$ is or are closed, and the used or spent fluid is discharged through the mold upon the removal of the formed vessel, or in cases where the vessel is forced completely through the mold the discharge of the spent fluid takes place as the vessel leaves the mold, whereupon the cocks $b^2$ are closed. If the metal or material of which the vessel is constructed is not sufficiently plastic to be worked at ordinary atmospheric temperatures it may be made plastic by heating the mold to a suitably high temperature, as for example by means of hot water or superheated steam flowing through a jacket surrounding the mold. In such case I prefer to use a gaseous fluid for effecting the shaping, which fluid can be worked expansively.

For loosening the finished articles from the mold A or from the plunger in cases where they have been produced by a solid plunger, I use the device illustrated in Fig. 3 which represents a hydraulic press G for actuating a plunger B which shapes the article C by forcing it through a die A.

G' is a guide for the plunger B supported by tie rods $G^2$. The plunger is pierced with holes $b$ $b$ similar to those described with reference to Fig. 1 for admitting fluid to the interior of the vessel when formed. The supply pipes $b'$ $b'$ which connect with the said holes $b$ $b$, are formed with knuckle joints $b^3$, $b^3$ to admit of their following the plunger in its to and fro movements. When the article is formed, the cocks $b^2$, $b^2$ are opened to admit the fluid under pressure which enters the vessel and forces the same out of the die and off the end of the plunger. The said cocks may be opened when required by hand or automatically by the movement of the finished article as follows. Where a liquid under pressure is used for discharging the finished article I provide a lever H pivoted at H' and connected by a link I to the handle or lever $b^4$ of the corresponding cock $b^2$. The lever H extends into the path of the vessel C as the latter is pressed downward by the plunger, and just before the article is finished its extremity encounters the lever H and depresses the same thereby opening the corresponding cock $b^2$ and allowing the liquid under pressure to enter the vessel. This liquid then operates to discharge the vessel from out of the die and off the end of the plunger. As soon as the vessel is thus discharged and the lever H thereby released, the cock $b^2$ is closed by a spring $b^5$ which acts on the tail end of the lever $b^4$. It will be obvious that when once the lever H is depressed by the descent of the vessel C it will be maintained by the sides of the vessel in the depressed position until the said vessel is discharged. When however a gaseous compressed fluid is employed for effecting the discharge of the finished article it is desirable to use said compressed fluid expansively so as to secure greater economy. For this purpose I use a lever $H^2$ pivoted at $H^3$ and a link I' coupled to the arm of the corresponding cock, which lever and link are similar to those above described used for a liquid. Instead however of allowing the finished article to operate directly on the lever $H^2$ I interpose between the said lever and article a trip lever J pivoted at J'. This lever when turned about its pivot by the descent of the finished article operates to turn and then release the lever $H^2$ so that the supply cock is only opened for a short interval, sufficient however to allow the requisite quantity of compressed fluid to enter the vessel and by its expansion to perform the work of discharging the same. The lever J is returned to its initial position, after the finished article is discharged, by a spring $J^2$.

In cases where the rods or links I, I' are required to be very long, they may be formed in two or more lengths connected by short levers.

Both arrangements for automatically actuating the cocks $b^2$, $b^2$ may exist together in the same apparatus, and either can be used as desired, the one not required being thrown out of action.

What I claim is—

1. In an apparatus for manufacturing hollow articles, the combination of a draw-plate A, a plunger B having a fluid thoroughfare $b$ therethrough and arranged in operative relation with the draw-plate, a liquid supply-pipe $b'$ connected with the thoroughfare, and a cock $b^2$ arranged in said pipe to control the flow of fluid through the thoroughfare in the plunger, substantially as described.

2. In an apparatus for manufacturing hollow articles, the combination of a draw-plate A, a plunger B having a fluid thoroughfare $b$ therethrough and arranged in operative connection with the draw-plate, a liquid-supply pipe $b'$ connected with the thoroughfare, a cock $b^2$ arranged in said pipe to control the flow of fluid through the thoroughfare, and cock-operating devices automatically actuated by the article as it is forced through the draw-plate to open the cock for the admission of fluid to the thoroughfare for discharging the article from the plunger, substantially as described.

3. In an apparatus for manufacturing hollow articles, the combination of a draw-plate A, a plunger B having a fluid thoroughfare $b$ therethrough and arranged in operative connection with the draw-plate, a liquid-supply pipe $b'$ connected with the thoroughfare, a cock $b^2$ arranged in the pipe to control the flow of fluid through the thoroughfare, cock-operating devices automatically actuated by the article as it is forced through the draw-plate to open the cock for the admission of fluid to the thoroughfare for discharging the article from the plunger, and means for automatically closing the cock after the article has been removed from the plunger, substantially as described.

4. The combination of a bottomless mold or draw-plate, a plunger projecting into the orifice in said draw-plate and rigidly held with respect thereto, and thoroughfares formed in said plunger for conducting a fluid under pressure therethrough, substantially as described for the purpose specified.

5. The combination of a die A, a plunger B, thoroughfares $b$, formed in said plunger, pipe $b'$ connecting with said thoroughfares and having a cock $b^2$, a link I connected with the handle of said cock and with a lever H, said lever H being arranged to extend into the path of the article formed by the plunger B and die A so as to be turned thereby when said article is finished, substantially as described for the purpose specified.

6. The combination of a die A, a plunger B, thoroughfare $b$ formed in said plunger, pipe $b'$ connecting with said thoroughfare and having a cock $b^2$, a link $I'$ connecting with the handle of said cock and with a lever $H^2$, and a trip lever J arranged to operate said lever $H^2$ and to extend into the path of the article formed by the plunger B and die A so as to be turned thereby when said article is finished, and thus momentarily turn the lever $H^2$ and open the cock $b'$, substantially as described, for the purpose specified.

In witness whereof I have hereunto set my hand this 8th day of February, 1893.

MICHEL ALBERT JOUËT-PASTRÉ.

Witnesses:
ROBT. M. HOOPER,
J. CHATEL.